United States Patent Office 3,834,873
Patented Sept. 10, 1974

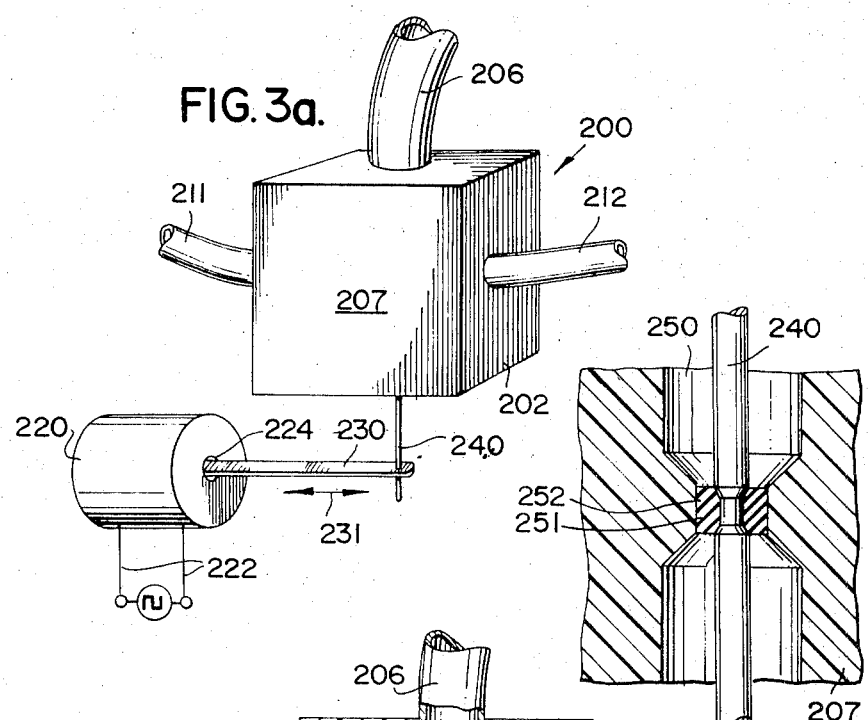
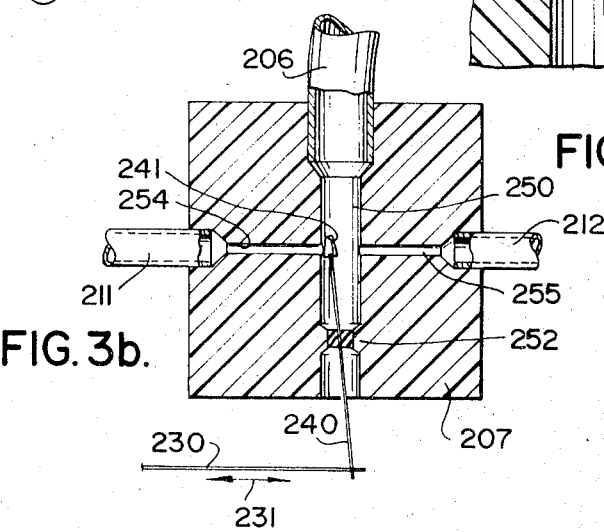
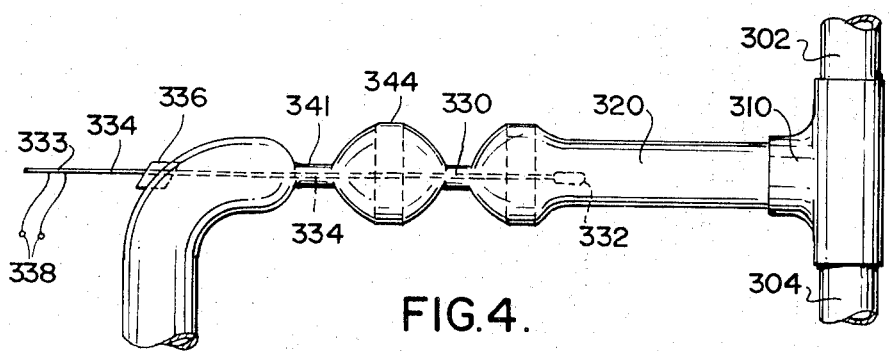

3,834,873
DIFFERENTIAL THERMAL DETECTION AND DIFFERENTIAL FLOW MICROCALORIMETRY
Patrick Picker, Sherbrooke, Quebec, Canada, assignor to Universite de Sherbrooke, Sherbrooke, Quebec, Canada
Filed Jan. 10, 1972, Ser. No. 216,543
Claims priority, application Canada, Dec. 29, 1971, 131,357
Int. Cl. G01k 17/02, 17/04; G01n 33/00
U.S. Cl. 23—230 R                           16 Claims

ABSTRACT OF THE DISCLOSURE

Differential detection in which a reference cell is used for comparison purposes with an observation cell in which a phenomenon takes place. Detection is obtained by means of a single thermo-electric sensor. The sensor is mounted to a common conduit of heat exchange liquid flow circuit which uses two branch circuits, one associated with each cell. A flow chopping element at the inlet ends of the branch circuits provides complementary periodic flow heat exchange liquid segments in the branch circuits. These segments are then fed into a common return circuit where the sensor is installed.

A differential flow microcalorimeter using counter flow heat exchangers through which a liquid is circulated in complementary periodic flow segments. The segments are combined in a common return tube where instantaneous temperature variations are detected and then analysed.

---

This invention relates to detection systems for the study of various phenomena, in particular thermal reactions, wherein the extent of the phenomenon is determined by differentiating a reading taken from an observation cell and the reading of a reference cell. The invention is also concerned with dynamic differential microcalorimeters for the study of thermal characteristics of fluids or mixtures of fluids, and in particular, this invention relates to microcalorimeters of the flow type such as disclosed in a patent application entitled "Differential Flow Calorimeter" filed in the United States on Feb. 24, 1970, under Ser. No. 13,433, now U.S. Pat. No. 3,726,644, issued on Apr. 10, 1973.

PRIOR ART

In accurate detection, it is customary to compare an observation cell to a reference cell. This is known as differential detection. This well known method has the advantage of causing self-cancellation of various sources of error. However prior to this invention, in the case of studies on fluid bodies, two distinct detector elements or sensors were required to effect the measurement prior to their differentiation. A major limiting factor when two sensors are used is of course the inevitable difference in response characteristics.

STATEMENT OF THE INVENTION

This invention provides differential detection wherein a single sensor is used.

Specifically, the invention provides a detection system for differentially measuring the extent of a phenomenon taking place in an observation cell with respect to a reference cell wherein a liquid flow system is provided which incorporates two flow branches each of which is associated with one of the cells. The outputs of the flow branches converge into a common return. At the input side of the flow branches, a chopping means feeds the flow branches with complementary periodic flow segments of liquid. A single sensor is disposed at the above noted return, which reads the instantaneous condition of the liquid flowing by.

The invention also provides a method of differential measurement by means of a liquid flow system, wherein complementary periodic flow segments of liquid are supplied to two parallel flow branches each of which is associated with a different one of an observation cell and a reference cell. The instantaneous value of a given condition of the liquid is measured in a common return section of the system where the complementary periodic flow segments of liquid converge.

A differential flow microcaloimeter using counter flow heat exchangers is also provided wherein the heat exchange liquid is fed to two branch circuits in complementary periodic flow segments by means of chopping means and the instantaneous temperature of the heat exchange liquid flowing in a common return is sensed by means of a single thermo-electrical sensing device.

The principle of operation and preferred embodiments of the present detection system and microcaloimeter will be given in detail hereinafter in connection with the accompanying drawings.

LIST OF DRAWINGS

FIGS. 3A to 3C are enlarged views of a chopping element; and

FIG. 4 is a partial enlarged view of a portion of the liquid flow system at the junction of the flow branches into the common return and illustrating also a typical installation of the thermo-electric sensor.

DESCRIPTION OF THE INVENTION

Figure 1:
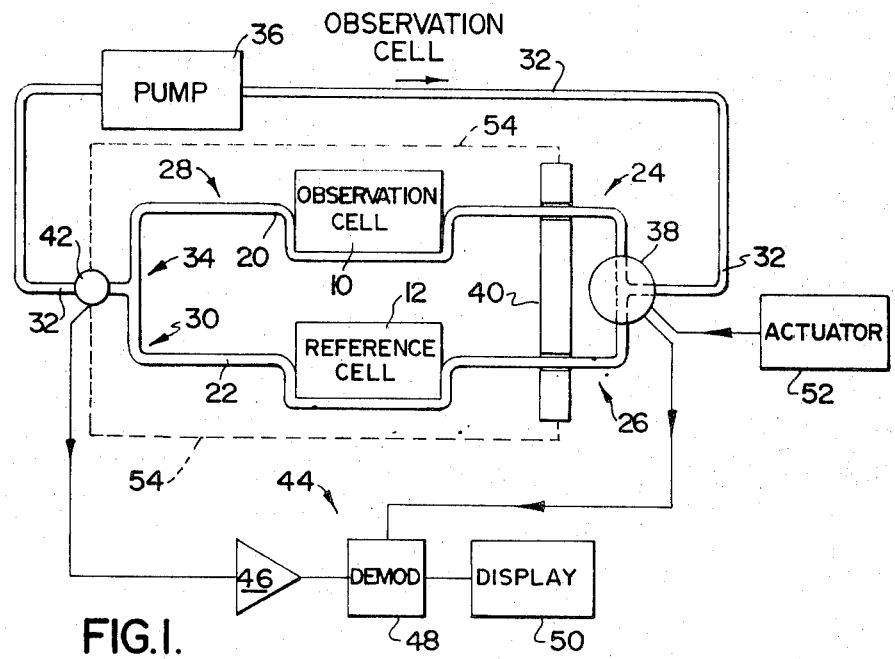
FIG. 1 is a schematic diagram of a detection system according to this invention.

FIG. 1 shows in schematic form a differential detection system embodying this invention. Referring to FIG. 1 wherein reference numerals are used to refer to the various elements shown schematically, the detection system comprises an observation cell 10 wherein a phenomenon under study takes place, and a reference cell 12 which serves as a dummy as is normally used for differential measurements. The system utilizes a liquid flow system for circulating a liquid which is sensible to the reaction taking place in the observation cell 10. Where the phenomenon under study is a thermal reaction of some sort, the condition of the liquid circulated in the liquid flow system will be its temperature.

The liquid flow system includes two parallel flow branches 20 and 22 each with an inlet end 24, 26 and an outlet end 28 and 30. The intermediate portions of flow branches 20, 22 are associated with a respective cell 10, 12, such that the phenomenon or reaction taking place within the observation cell would influence a condition of the liquid in the related flow branch 20, and if there were a reaction taking place in the reference cell 12, the liquid flowing through the other flow branch 22 would likewise be affected. However, cell 12 being used as a reference or "dummy," no reaction should be induced therein.

The outlet ends 28, 30 converge into a common outlet conduit 32 by means of suitable coupling means 34. Details of a coupling 34 will be given hereinafter. Outlet conduit 32 leads to the inlet of a pumping device 36; outlet conduit 32 also extends from the outlet of pumping device 36 to the inlet ends 24, 26 of flow branches 20, 22. Connection of outlet conduit or return 32 with flow branches 20, 22 is, however, effected by means of a chopping device 38 which effects alternate flow "switching" from one inlet end 24 to the other 26 and vice-versa as will be explained in greater detail below. Hence, chopping device 38 has its input line connected to conduit 32 downstream from pumping device 36, and has two outputs each directly feeding one of the two flow branches 20, 22.

The detection system in FIG. 1 also comprises a liquid conditioning means 40 whose function is to even out all possible fluctuation in the liquids condition. Where the condition that carries the required information is the temperature of the liquid itself, conditioning means 40 takes the form of a thermo-regulator, which sets the temperature of the liquid prior to reaching the level of the observation and reference cells 10, 12. Also part of the detection system is a sensing device 42 located at the outlet conduit or return 32 adjacent the coupling means 34. Sensor 42 is adapted to yield a signal which is representative of the instantaneous condition of the liquid circulating in conduit 32 at the location of sensor 42. This signal is then fed to a suitable analysing means 44 which determines the amplitude of the signal.

For sensing the temperature of the liquid circulating in conduit or return 32, a thermo-electric sensor is used whose electrical signal output can be evaluated directly by a suitably matched potential meter such as a VTVM. For more accurate readings, the analysing means 44 can incorporate a narrow frequency band pass amplifier 46, a demodulator circuit 48 preferably synchronized in frequency and in phase to the chopping device 38, and a suitable display means 50 such as an X-Y plotter.

The operation of the system thus far described is essentially as follows. Assuming a thermal phenomenon taking place in observation cell 10, for example, the mixing of two different liquid substances, and of course no reaction in reference cell 12; the intermediate sections of flow branches 20, 22 being in intimate heat-exchange relationship with the reaction area or section of observation cell 10, the liquid circulated through flow branch 20 will undergo a temperature change proportionally to various factors. These include the amount of heat generated or absorbed by the mixing reaction, the specific heat ratio of the heat exchange liquid and reacting substances, the flow rate of the heat exchange liquid and the thermal relationship of the cell to the associated flow branch.

As noted above, element 38 is a flow chopping device whose function is to provide alternate supply of heat exchange liquid emanating from the pump 36 via return 32 between the inlet ends 24, 26 of the flow branches 20, 22. Chopper 38 which is driven into operation by actuating means 52 feeds complementary periodic flow segments of heat exchange liquid, which segments circulate respectively through flow branches 20, 22 to coupling 34 where they recombine into a continuous liquid flow. However it will be realized that provided the internal cross sections of conduits 20, 22 and return 32 are sufficiently small in regards to the frequency of operation of chopper 38, the flow segments which recombine at coupling 34 can be sufficiently long that mixing of the successive segments is only partial. The result therefore is that sensor 42 which should be relatively close to coupling 34 will "see" flowing by it series of liquid flow segments of equal length but of varying temperature if in fact the reaction in observation cell 10 had a thermal effect upon the heat exchange liquid in flow branch 20.

The reading of sensor 42 will therefore be an oscillating temperature the peak-to-peak value of which being directly proportional if not equal to the temperature difference between the heat exchange liquid at the outlet end of flow branches 20, 22. The electrical signal obtained from a thermo-electrical sensor 42 can be analysed by means of a suitable voltage meter such as VTVM or the like. Where better signal to noise ratio is desired, the analysing means 44 includes a narrow frequency band pass amplifier 46 compatible with the frequency of actuating means 52, a demodulator 48 synchronized to actuating means 52 and a suitable display means 50 such as for example, a X-Y chart recorder. For microcalorimetry measurements, it is necessary to insure proper insulation of critical components of the liquid flow system thus far described. In FIG. 1 the area enclosed within dotted line 54 which extends from the thermostating means 40 to and including the section of return tube 32 where sensor 42 is located indicates these critical components. In most applications proper insulation from ambient conditions is obtained by evacuating the area 54.

Figure 2:
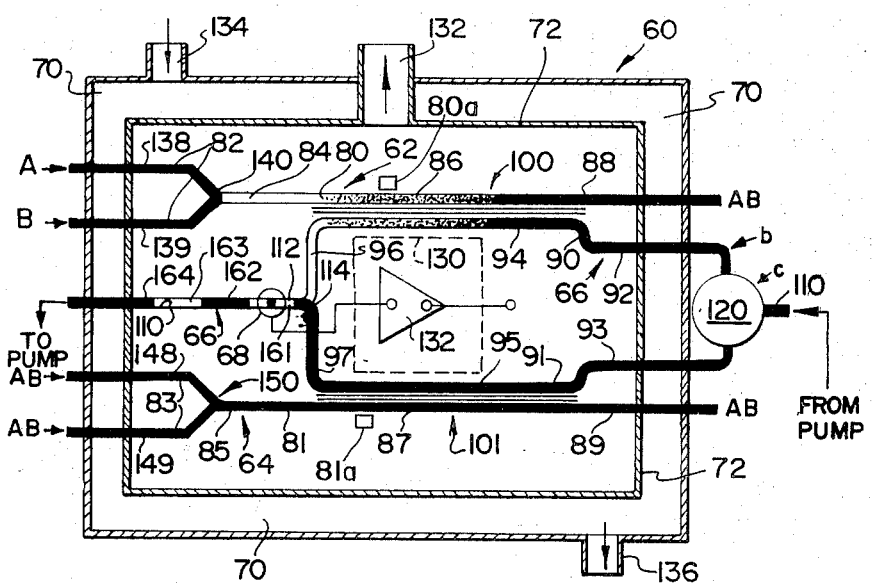
FIG. 2 is a schematic diagram of a dynamic microcalorimeter according to this invention.

FIG. 2 illustrates a differential flow microcalorimeter of the type described in the patent application entitled Differential Flow Calorimeter referred to above, but embodying a direct comparison or modulated flow detection system, so that only one sensing device is required. The microcalorimeter referred to generally by reference numeral 60 comprises a reaction flow circuit 62, a reference flow circuit 64 similar to reaction circuit 62, a heat exchange liquid circuit 66, a temperature sensing means 68 which measures the temperature variations at the output of the heat exchange liquid circuit 66, a temperature conditioning means 70 for thermostating the liquids and/or fluids entering the various circuits, and enclosing means 72 which insulates critical portions of the circuits 62, 64, 66.

Reaction and reference circuits 62, 64 are designed to be physically identical to one another since the object of duplicating the reaction circuit is to create a second source of error which can be differentially associated to the "active" system. In microcalorimeters, the errors which one wants to eliminate by differential means are heat created by fluid friction, heat losses through the surroundings, temperature variations in the temperature conditioning means 70, etc.

Each circuit 62, 64 comprises a small internal cross-section tubular element 80, 81 which forms an inlet region 82, 83, a mixing region 84, 85, a heat exchange region 86, 87, and an outlet region 88, 89. Tubular element 80, 81 is made of thermally conductive material at least at its heat exchange region 86, 87, for example stainless steel. The outlet region 88 of the reaction flow circuit 62 is serially connected (not shown) to the inlet region 83 of the reference flow circuit 64.

The heat exchange liquid circuit 66 comprises two branch circuits 90, 91 each formed of a small tubular element. This tubular element also has an inlet end 92, 93, an intermediate region 94, 95 made of thermally conductive material, for example stainless steel, and an outlet end 96, 97. The intermediate region 94, 95 of each branch circuit 90, 91 is associated with the heat exchange region 86, 87 of the associated flow circuit 62, 64 to form therewith a counter flow heat exchanger 100 and 101.

The heat exchange liquid circuit 66 also includes a common return 110 which extends from the outlet ends 96, 97 to the inlet ends 92, 93 of the flow branch tubular elements 90, 91. Return 110 comprises a tubular element 112 of small internal cross-section and of a suitable length for mounting the temperature sensing means 68, i.e., a thermo-electric sensor. A coupling 114 is provided at the junction of outlet ends 96, 97 to tubular element 112. Although not illustrated in FIG. 2, return 110 connects to the inlet side of a pump as indicated at "To Pump" and extends from the discharge end thereof to the inlet ends 92, 93 of branch circuits 90, 91 as indicated by "From Pump." A fluid flow chopping means 120 interconnects return 110 to inlet ends 92, 93 in the same manner as detailed hereinbefore in connection with element 38 of FIG. 1. Hence, chopper 120 provides an alternate supply of heat exchange liquid from the pump and return 110 to the two branch circuits 90, 91, that is complementary periodic flow segments. Signal analysing means 130 is illustrated as a simple amplifying circuit 132 but in measuring extremely small temperature variations analysing means 130 should incorporate a narrow frequency band pass amplifier leading to a synchronized demodulator hooked up to a suitable read-out device such as an X-Y chart recorder.

In operation, air is evacuated from within the enclosing chamber defined by walls 72 via outlet 132, and a constant temperature liquid is circulated through the temperature conditioning jacket 70 from inlet port 134 to outlet port 136. Then liquids or gases A and B are supplied to the inlet region 82 of the reaction flow circuit tubular element 80. This inlet region includes two feed tubes 138, 139 which merge at a junction 140. The temperature of fluids A and B are regulated by means of jacket 70 upstream from junction 140 where they are allowed to mix. Mixing takes place in mixing region 84 which is made sufficiently long to permit complete reaction between fluids A and B. Mixture AB whose temperature is different from that of fluids A and B then proceeds through tube 86 of counter flow heat exchanger 100 while a heat exchange liquid circulates in an interrupted flow in tube 94 of heat exchanger 100 but in a direction opposite mixture AB. Since the heat exchange liquid is also thermostated under the action of temperature conditioning means or jacket 70 prior to entering tube 94, its temperature is equal to that of fluids A and B but is different from that of mixture AB between mixing region 84 and heat exchange tube 86. Tubes 86 and 94 are intimately related to one another in a heat exchange relationship so that a heat transfer between mixture AB and the heat exchange liquid will take place. Assuming now that the flow rate of the heat exchange liquid in terms of specific heat (effective flow rate) is considerably less than that of fluid mixture AB, the reaction heat will be only partially transferred to the heat exchange liquid since its temperature will soon reach and remain at the temperature of mixture AB. Hence, the temperature of the heat exchange liquid at outlet end 96 is exactly equal to the temperature of mixture AB as it enters tube 86, and the system is operating in the adiabatic mode. If on the other hand the heat transfer takes place in the isothermal mode, that is, where the effective flow rate of the heat exchange liquid is superior to that of mixture AB, all the reaction heat, be it a gain or a loss, will be picked up by the heat exchange liquid. In this latter case, the temperature of the heat exchange liquid at outlet end 96 will reflect the total reaction heat independently of the specific heat of mixture AB. By comparison, in the adiabatic mode, the temperature change of the heat exchange liquid reflects the temperature change of mixture AB.

At equal effective flow rates, however, the system may be less accurate and may give ambiguous readings because the heat exchangers are operating along their entire lengths. It is therefore recommended to use effective flow rate ratios of the order of 2.

For differential measurement, mixture AB from outlet region 88 is supplied to the inlet region 83 of the duplicate or reference flow circuit 64; feed tubes 148, 149 corresponding to feed tubes 138, 139 merging at junction 150 in the same manner as junction 140 form the inlet region 83. Mixture AB then circulates successively through mixing region 85, heat exchange region or tube 87 and then outlet region or discharge tube 89. Simultaneously, chopper 120 supplies periodic flow segments to inlet end 93 of heat exchange circuit tubular element 91. Prior to injection in the duplicate system, mixture AB and the heat exchange liquid are thermo-regulated by the same temperature conditioning jacket 70. Heat exchanger 101 being identical to heat exchanger 100 and being operated in counter flow and in the same heat transfer mode, any heat losses or gains induced in the fluid and liquid flow circuits will be present in equal amounts in the heat exchange liquid flow segments in outlet tubes 96, 97.

These liquid segments then proceed to coupling 114 which is designed to limit interface mixing as much as possible as the segments emanating from tubes 96, 97 interleave one another in return tube 112. In FIG. 2, shading in tubular elements 80, 90 and 112 indicates temperature gradients. The temperature of the liquid flowing through tube 94 is shown as gradually changing from inlet end 92 to outlet end 96 but in tube 95, (the changes are so small that they are not shown by shading. However the temperatures of the heat exchange liquid in outlet ends 96 and 97 are relatively different although probably only by infinitesimal amounts. Shading however is useful to show in return tube 112 the recombination of the complementary periodic flow segments 161, 162, 163, 164 which form a continuous liquid flow. Eventually the various segments will intermix so that the temperature of the continuous flow will reach an intermediate essentially constant value. In the vicinity of tube 112, however, provided the internal cross-section is sufficiently small in relation to the volume of the individual flow segments, interface mixing will not be unduly objectionable and the thermo-electric sensor 68 will be able to alternately read the temperature of the liquid flowing in tubes 96, 97. Hence direct comparison of the temperatures of two liquid flows is obtained through the use of a single sensing element 68.

The electrical signal at the output of sensor 68 which it was found can advantageously be a thermistor, is essentially an alternating voltage the peak-to-peak (or RMS) value of which is directly related to the reaction heat or the mixture temperature change. As noted hereinbefore, for accurate readings the signal from the sensor should be fed to a narrow bandpass amplifier and a synchronized demodulator and then to a suitable readout device, and means should be provided which triggers chopper 120 at a predetermined frequency and in phase with the demodulator. Such systems are used in electronic applications, and are known as "lock-in amplifiers." In fact, lock-in amplifiers are commercially available, and one particular system found suitable for application in the present microcalorimeter and given as an example only is made by Princeton Applied Research, Princeton, N.J., U.S.A., and know as "model 220." With reference to FIG. 1, such a lock-in system would combine the functions of elements 46, 48 and 52.

The various tubular elements used in a flow microcalorimeter as shown in FIG. 2 should be of chemically inert materials such as not to react with the fluids in presence, and should be of relatively small section, typically 40 thousandths of an inch inside diameter. In addition, in the heat exchanger sections, such tubes must be good thermal conductors. Therefore, it was found preferable to use thin walled tubing made of stainless steel in such sections, and in fact it may be easier to use such tubing throughout the system. At the heat exchange sections, however, the juxtaposed counter flow tube segments are helically wound around one another in the fashion of the strands of a cable, and silver soldered in place.

The flow rates of the mixture and of the heat exchange liquids should be different (as noted before, their ratio being typically 2:1), and may vary from about 0.5 to about 2 cc. per minute; the frequency of operation of the chopper likewise is not critical and may be selected within the range of from 2 Hz. to about 10 Hz.

The pumps used for circulating the heat exchange liquid, normally distilled water, and fluids A and B should be as free from noise as posible, i.e. "pulseless," and of a type which enables flow rate variations; for example peristaltic pumps.

FIGS. 3A, and 3B, illustrate a liquid flow chopping mechanism found suitable for application in the systems thus far described, but shown in large scale.

FIG. 3A shows a chopper 200 which comprises a two-way valve 202, with one inlet 206 and two outlets 211, 212, and actuator 220 to which is applied a square wave triggering signal across inputs 222, a reciprocatory arm 230 interconnecting the moving element or core 224 of actuator 220 to the lower end of needle 240 of valve 202. FIG. 3B is a cross-section taken through a median vertical plane of valve 202. Valve 202 consists of a plastic body 207 having a main bore 250 forming a supply chamber in communication with inlet 206, but having a restriction 252 toward the opposite end of bore 250 serving as a fulcrum to needle 240. A silicone rubber gasket 251 secured to needle 240 serves the function of sealing bore 250 and holding the needle in place.

In the opposite direction two secondary bores are provided 254, 255 each communicating with one of outlets 211, 212, and main bore 250. Needle 240 carries at its end opposite arm 230 a small silicone rubber stopper 241 capable of isolating either one of bores 254, 255 from main bore 250.

Actuator 220 may be a simple electromagnetic vibrator such as a loudspeaker coil, having a movable element or core 224 capable of sufficient axial displacement.

In operation, a relatively low frequency (2 to 0 Hz.) square wave triggering signal emanating from a signal generator or from the above noted lock-in amplifier is applied across input leads 222 of actuator 220 whereupon core 224 and the attached arm 230 move in the direction of arrow 231 between two extreme positions causing needle 240 to rock about pivot point 252 between two different angular positions. In one position, valve head 241 closes the opening to bore 254 allowing the heat exchange liquid from tube 206 (return 32 in FIG. 1 and return 110 in FIG. 2) to flow through bores 250, 255 and out via outlet 212 (say circuit 24 in FIG. 1 or tube section 92 in FIG. 2). As the signal waveform changes from one polarity to the other, needle 240 switches position blocking bore 255 thus allowing liquid to flow from inlet 206 through bore 250, bore 254 and outlet 211 (circuit 26 in FIG. 1 or tube section 93 in FIG. 2). This cyclic operation occurs at the same frequency as that of the triggering signal applied to actuator 220. The result therefore is that the constant flow of liquid at inlet 206 is divided into series of periodic complementary flow segments obtained at outlets 211, 212.

Toward the other end of the heat exchange liquid flow circuits represented in FIGS. 1 and 2, a junction is provided which permits the above noted flow segments to recombine into a continuous flow liquid in the heat exchange liquid system's return and where a temperature sensor is installed. An exemplary junction is illustrated in enlarged scale in FIG. 4.

Junction 300 comprises two incoming tubes 302, 304, a T-shaped coupling 310, and a common return tube 320. Where stainless steel tubing is used, coupling 320 may be made of similar material so that the mating ends can be secured in place by soldering.

Tube 320 which returns the heat exchange liquid to the pump also serves to mount a suitable thermal sensing device. As shown in FIG. 4, the thermo-electric temperature sensor 330 comprises a sensing head 332 supported to one end of stem 334 which extends into tube 320 through a small hole and a sealing gasket 336. Towards the opposite end of stem 334, leads 338 can be seen which are used to electrically connect sensor head 332 to the amplifier input provision of the lock-in amplifier system (shown in FIG. 1 at 46). The intermediate portion of stem 334 is located centrally of tube 320 by means of a series of depressions 341 to 344 obtained by carefully pinching tube 320 at spaced apart locations in two planes at 90°. In this manner, by actuation of the free end 333 of stem 334, the sensor head 332 can be moved along the axis of tube 320.

In fact, it was found that by keeping sensor head 332 in the axis of tube 320 therefore in the center of the heat exchange liquid flow, a more accurate reading could be expected since there should be more interface mixing of the successive flow segments at the other locations due to friction and adhesion of the liquid along the inner wall of tube 320.

Moreover, by properly locating sensor head 332 along tube 320, it was found possible to eliminate whatever noise there could be due to the switching effect of the chopper; this is of course feasible only if the amplifying circuitry incorporates a phase synchronized demodulator such as at 48 in FIG. 1.

As noted hereinbefore, the thermo-electric sensing device used in detectors or microcalorimeters according to this invention is preferably a thermistor as opposed to a thermocouple due to the higher sensitivity of the former which may be of the order of 20 mv./° K. compared to 40 micro-volts/° K. However, for detecting wider temperature variations, and/or where a preamplifier circuit is used, thermocouples can find application.

It should also be noted that rather than measure the current flowing through the thermistor, or the potential appearing at the output of the thermocouple, this signal could be used to drive via suitable circuitry a heating element thereby to supply heat in measured amounts to the colder one of the two mixture flow circuits such as at 80 and 81 of FIG. 2, until the temperature sensed by sensor head 68 is constant. Indeed, where the heating element is a Zener diode as shown in FIG. 2 at 80a and 81a, the amount of heat dissipated thereby is directly proportional to the current flow, and this current can be easily measured. One advantage of such a closed loop feedback system using Zener diodes is that the lack of linearity in the sensor's response or variation thereof does not affect the ultimate reading, and the apparatus is practically automatically calibrated. The frequency of chopper 120, however, should not normally be less than 5 Hz.

In practice, both flow systems 80, 81 are preferably heated by means of Zener diodes as this provides an artificial zero and a polarity indication depending on which system is receiving more heat.

I claim:
1. A detection system including means for differentially measuring the extent of a thermal phenomenon taking place in an observation cell by comparison with a reference cell, comprising: liquid flow system means for receiving therein a liquid capable of responding to said thermal phenomenon in a manner related to the extent of said thermal phenomenon, said liquid flow system means having:
 (a) two parallel flow branches each with an inlet end and an outlet end, one of said flow branches being thermally coupled with said observation cell such that the thermal phenomenon taking place therein can change the temperature of the liquid present in the associated flow branch, the other flow branch being similarly associated with said reference cell,
 (b) coupling means for interconnecting said flow branches at their outlet ends to a common outlet conduit,
 (c) pumping means for controllably circulating said liquid through said liquid flow system means, said pumping means having an inlet end and an outlet end, the inlet end of said pumping means being connected to said common outlet conduit, and
 (d) fluid flow chopping means having an inlet end and two outlet ends, the inlet end of said fluid flow chopping means being in circuit connection with the outlet end of said pumping means, and each outlet end of said fluid flow chopping means being connected to the inlet end of a different one of said flow branches, said fluid flow chopping means being adapted for alternate supply of liquid emanating from the outlet end of said pumping means to said two flow branches at a predetermined frequency,
said detection system also comprising (i) thermostating means for thermostating said liquid upstream from said cells, (ii) sensing means located at said common outlet conduit adjacent said coupling means for producing a signal representative of the instantaneous temperature of the liquid flowing past said sensing means through said common outlet conduit, and (iii) electrical signal analysing means for determining the amplitude of said signal.

2. A detection system as defined in claim 1 wherein said electrical signal analysing means comprises a narrow frequency band pass amplifier, a demodulator circuit, and output signal display means.

3. A detection system as defined in claim 1 wherein said fluid flow chopping means comprises a body made of rigid material and having a central bore, two secondary bores, and a supply chamber comprised within said central bore, said secondary bores each having an opening in said supply chamber on opposite sides thereof, said fluid flow chopping means also comprising valve means displaceable within said supply chamber for closing the opening of either of said secondary bores, and actuating means for actuating said valve means thus successively closing the openings of said secondary bores from said supply chamber at a predetermined frequency.

4. A method of differentially measuring the extent of a thermal phenomenon taking place in an observation cell with respect to a reference cell comprising circulating a flow of heat exchange liquid through a liquid flow system, chopping said flow of heat exchange liquid into segments by a chopper operating at a predetermined frequency, feeding every second segment of the heat exchange liquid to a first flow branch of said liquid flow system, feeding the other segments of heat exchange liquid to a second flow branch of said liquid flow system, said first and second branches being of small cross-section and each branch being in close heat exchange relationship with a different one of said cells, circulating said segments through a common tubular conduit of small cross-section, and sensing the instantaneous temperature of the liquid flowing through said common tubular conduit.

5. A differential thermal detection system including means for measuring the extent of a thermal reaction taking place in an observation cell relative to a reference cell, comprising a heat exchange liquid flow circuit means for circulating a heat exchange liquid therethrough and bringing said liquid in a close heat exchange relationship with said observation and reference cells, temperature sensing means for measuring the temperature variations of said heat exchange liquid downstream from said cells, and temperature conditioning means for thermoregulating the temperature of said heat exchange liquid upstream of said cells; said liquid flow circuit comprising:

(i) two branch circuits each of which being formed of a tubular element of small internal cross-section having an inlet end and an outlet end and having its intermediate region in heat exchange relationship with a different one of said cells, (ii) common return circuit extending from the outlet ends of said branch circuits to the inlet and thereof, the internal cross-section of said return circuit adjacent said outlet ends being relatively small, (iii) pumping means in said common return circuit for controlling the flow of heat exchange liquid through said liquid flow circuit, (iv) coupling means for interconnecting the outlet ends of said branch circuits to said common return circuit, and (v) fluid flow chopping means alternately connecting said common return circuit to the inlet end of each one of said branch circuits at a predetermined frequency for forming complementary periodic flow segments of said liquid in said branch circuits.

6. A system as defined in claim 5 wherein said temperature sensing means comprises a single thermo-electric sensor mounted to said return circuit adjacent said coupling means for producing an electrical signal related to the instantaneous temperature of the liquid flowing in said return circuit past said sensor, and signal analysing means for determining the amplitude of the fundamental component of said electrical signal.

7. A system as defined in claim 6 wherein said sensor consists of a thermistor mounted in good thermal contact with said liquid, and wherein said signal analysing means comprises a narrow frequency band amplifier circuit the input of which being fed said electrical signal, a demodulator circuit serially connected to the output of said amplifier circuit and synchronized in phase with said fluid flow chopping means, and display means in circuit with the output of said demodulator circuit.

8. A system as defined in claim 5 wherein said fluid flow chopping means comprises a body made of rigid material and having a central bore, two secondary bores, and a supply chamber comprised within said central bore, said secondary bores each having an opening in said supply chamber on opposite sides thereof, said fluid flow chopping means also comprising valve means displaceable within said supply chamber for closing the opening of either of said secondary bores, and actuating means for actuating said valve means and thus successively closing the openings of said secondary bores from said supply chamber at a predetermined frequency.

9. A differential flow microcalorimeter comprising:

(a) a reaction flow circuit,
(b) a reference flow circuit duplicate of said reaction flow circuit,
(c) a heat exchange liquid circuit,
(d) temperature sensing means for measuring the temperature variations in said heat exchange liquid circuit,
(e) temperature conditioning means for thermostating fluids entering said circuits, and
(f) enclosing means for thermally insulating from ambient conditions at least portions of said circuits, each of said reaction and reference flow circuits essentially comprising a small internal cross-section tubular element defining an inlet region followed by a mixing region followed by a heat exchange region followed by an outlet region, and made of thermally conductive material at least at said heat exchange region, the outlet region of said reaction flow circuit being serially connected with the inlet region of said reference flow circuit; said heat exchange liquid circuit comprising two branch circuits, each of which being formed by a tubular element of small internal cross-section and having an inlet end, an outlet end and an intermediate region made of heat conductive material, and in close heat exchange relationship with an intermediate region of a different one of said reaction and reference flow circuits to define a counter-flow heat exchanger, said heat exchange liquid circuit also comprising: (i) a common return extending from the outlet ends of said branch circuits to the inlet ends thereof and comprising a tubular element adjacent said last mentioned outlet ends, (ii) coupling means for interconnecting said last mentioned outlet ends to the tubular element of said common return, (iii) pumping means in said common return for controlling the flow of liquid in said heat exchange liquid circuit, and (iv) fluid flow chopping means for alternately connecting said common return to the inlet end of each one of said branch circuits at a predetermined frequency thereby to form complementary periodic flow segments of liquid in said branch circuits; said temperature sensing means comprising a thermo-electric sensor mounted to the tubular element of said common return.

10. A microcalorimeter as defined in claim 9 wherein said fluid flow chopping means comprises a body made of rigid material and having a central bore, two secondary bores, and a supply chamber comprised within said central bore, said secondary bores each having an opening in said supply chamber on opposite sides thereof, said fluid flow chopping means also comprising valve means displaceable within said supply chamber for closing the opening of either of said secondary bores, and actuating means for actuating said valve means and thus successively closing the openings of said secondary bores from said supply chamber at a predetermined frequency.

11. A microcalorimeter as defined in claim 9 wherein said temperature sensing means further comprises signal analysing means for determining the amplitude of the fundamental component of the signal yielded by said sensor.

12. A microcalorimeter as defined in claim 11 wherein said signal analysing means comprises amplifying means for feeding a demodulator circuit locked in phase to the actuating means of said chopping means.

13. A microcalorimeter as defined in claim 12 wherein said sensor consists of a thermistor secured to one end of an elongated stem extending along the axis of said tubular element of said common return and held in position by successive pinching of said last mentioned tubular element; said stem being movable along the axis of said last mentioned tubular element.

14. A microcalorimeter as defined in claim 10 comprising a Zener diode physically mounted to one of said reaction and reference flow circuits upstream from the heat exchange region thereof and in close thermal contact therewith, and circuit means for supplying current to said Zener diode proportionately to the intensity of the thermo-electric sensor's output; said microcalorimeter further including current measuring means for measuring the current flowing through said Zener diode.

15. A microcalorimeter as defined in claim 14 including a duplicate Zener diode mounted to the other one of said reaction and reference flow circuits.

16. A microcalorimeter as defined in claim 9 wherein the inlet region of each said reaction and reference flow circuits has a pair of merging feed tubes.

References Cited

UNITED STATES PATENTS

| | | | |
|---|---|---|---|
| 3,471,262 | 10/1969 | Hrdina | 23—230 R |
| 3,669,626 | 6/1972 | Thiens et al. | 23—230 R X |

JOSEPH SCOVRONEK, Primary Examiner

U.S. Cl. X.R.

23—232 E, 253 R, 254 E; 73—190 R; 137—829.